United States Patent
Watanabe et al.

(10) Patent No.: US 9,606,554 B2
(45) Date of Patent: Mar. 28, 2017

(54) VOLTAGE ADJUSTMENT DEVICE FOR POWER DISTRIBUTION SYSTEM, VOLTAGE ADJUSTING METHOD, AND POWER CONTROL SYSTEM

(71) Applicants: Hitachi, Ltd., Tokyo (JP); Tohoku Electric Power Co., Inc., Miyagi (JP); Tohoku Electric Manufacturing Co., Ltd., Miyagi (JP)

(72) Inventors: Masahiro Watanabe, Tokyo (JP); Ryo Egashira, Tokyo (JP); Kenichiro Yamane, Tokyo (JP); Katsuhiro Matsuda, Sendai (JP); Takafumi Futakami, Sendai (JP); Toshiyuki Seto, Sendai (JP); Jun Murakoshi, Tagajo (JP)

(73) Assignees: Hitachi, Ltd., Tokyo (JP); Tohoku Electric Power Co., Ltd., Miyagi (JP); Tohoku Electric Manufacturing Co., Ltd., Miyagi (JP)

( * ) Notice: Subject to any disclaimer, the term of this patent is extended or adjusted under 35 U.S.C. 154(b) by 135 days.

(21) Appl. No.: 14/418,236

(22) PCT Filed: Jul. 24, 2013

(86) PCT No.: PCT/JP2013/069987
§ 371 (c)(1),
(2) Date: Jan. 29, 2015

(87) PCT Pub. No.: WO2014/021152
PCT Pub. Date: Feb. 6, 2014

(65) Prior Publication Data
US 2015/0286227 A1    Oct. 8, 2015

(30) Foreign Application Priority Data

Aug. 1, 2012  (JP) .................................. 2012-170931

(51) Int. Cl.
G05F 1/14          (2006.01)
H02J 3/18          (2006.01)

(52) U.S. Cl.
CPC .............. *G05F 1/14* (2013.01); *H02J 3/1878* (2013.01); *Y02E 40/12* (2013.01); *Y02E 40/30* (2013.01)

(58) Field of Classification Search
CPC .......... H02J 3/1878; G05F 1/14; G05F 1/147; Y02E 40/12; Y02E 40/16; Y02E 40/34
See application file for complete search history.

(56) References Cited

U.S. PATENT DOCUMENTS

2013/0030586 A1* 1/2013 Milosevic ................. H02J 3/12
                                                       700/292
2013/0234696 A1* 9/2013 Bryson ...................... G06F 1/26
                                                       323/340

FOREIGN PATENT DOCUMENTS

CN       201805234 U  *  4/2011
JP           662536        3/1994
(Continued)

OTHER PUBLICATIONS

Noorbakhsh, M; Afzalian, A; Modeking and Synthesis of DES Supervisory Control for Coordinating ULTC and SVC; Jun. 12, 2009; IEEE American Control Conference, pp. 4759-4764.*

(Continued)

*Primary Examiner* — Harry Behm
(74) *Attorney, Agent, or Firm* — Mattingly & Malur, PC (57) ABSTRACT

A voltage adjustment device, a voltage adjusting method and a power control system for a distribution system are provided, in which the voltage adjustment device and a static var compensator are appropriately operated in a coordinated manner and the sustention of voltage and the enhancement of the operation efficiency are attained. A voltage adjustment device for a distribution system is installed in the distribution system including a static var compensator on an end side and controls a secondary voltage to be within a prede- (Continued)

termined limit value by adjusting a tap position. The voltage adjustment device includes a first unit configured to estimate the secondary voltage; a second unit configured to obtain a corrected voltage by correcting the estimated secondary voltage by using a correction amount obtained from an output of the static var compensator; and a third unit configured to compare the corrected voltage with the predetermined limit value and operate the tap position when the corrected voltage deviates from the predetermined limit value.

10 Claims, 8 Drawing Sheets

(56) References Cited

FOREIGN PATENT DOCUMENTS

| JP | 2002281669 | 9/2002 |
| JP | 2004320859 | 11/2004 |
| JP | 2006166683 | 6/2006 |
| JP | 2009065788 | 3/2009 |
| JP | 2010220283 | 9/2010 |

OTHER PUBLICATIONS

Son, Kwang; Moon, Kyeong; Lee, Song; Coordination of an SVC with a ULTC Reserving Compensation Margin for Emergency Control; IEEE Transactions on Power Delivery, vol. 15 No. 4, Oct. 2000; pp. 1193-1198.*

Chang; Abstract and Drawing of CN201805234U, Apr. 2011; Derwent pp. 1-3.*

International Search Report in PCT/JP2013/069987, dated Oct. 1, 2013, 3 pages.

* cited by examiner

VOLTAGE ADJUSTMENT DEVICE FOR POWER DISTRIBUTION SYSTEM, VOLTAGE ADJUSTING METHOD, AND POWER CONTROL SYSTEM

FIELD OF THE INVENTION

The present invention relates to voltage adjustment devices, voltage adjusting methods and power control systems for distribution systems, and in particular relates to a voltage adjustment device, a voltage adjusting method and a power control system for a distribution system, which correspond to voltage fluctuation in a distribution system, make the voltage adjustment device and a static var compensator appropriately operate in a coordinated manner, and attain the sustention of voltage and the enhancement of operating efficiency.

BACKGROUND OF THE INVENTION

The voltage of a distribution system is controlled by a tap change of a transformer (on-load tap-changing transformer LRT: Load Ratio Control Transformer) installed in a distribution substation or a tap change of an automatic voltage regulator (SVR: Step Voltage Regulator) installed on a distribution line. The on-load tap-changing transformers LRT and the automatic voltage regulators SVR adjust voltage by a machine mechanism (tap). The transformers and regulators will be hereafter collectively designated as voltage adjustment devices SVR.

These voltage adjustment devices SVR are generally so set that the devices operate with a response time constant of several tens of seconds before a tap change. When a plurality of voltage adjustment devices are installed in series in a distribution line, the response time constant of a voltage adjustment device installed on the end side of the distribution line (feeder) is generally slower than the response time constant of a voltage adjustment device installed on the substation side (sending side). Unnecessary operations of the voltage adjustment device on the end side are thereby reduced.

In recent distribution systems, the number of customers equipped with a solar power generation device has been increased. In this case, the power output of each solar power generation device depends on the weather fluctuation and is a cause of abrupt voltage fluctuation in distribution systems.

Meanwhile, suppression of abrupt voltage fluctuation is expected by connecting to a distribution system a SVC (static var compensator) or a STATCOM (static synchronous compensator) having a function of suppressing the voltage fluctuation by high-speed reactive power output control. The SVC and the STATCOM carry out reactive power compensation by a static mechanism (such as IGBT). These compensators will be hereafter collectively designated as static var compensator SVC.

When a voltage adjustment device SVR and a static var compensator SVC are installed in a distribution system, the voltage adjustment device SVR including a machine mechanism is installed on the substation side (sending side) and the static var compensator SVC operated with a static mechanism is installed on the end side of the distribution line (feeder). This arrangement is against the idea of conventional time coordinated control that a slower response time constant is set closer to the end of the feeder.

For this reason, when a voltage adjustment device SVR and a static var compensator SVC are installed together in a distribution system, the static var compensator SVC operates ahead of the voltage adjustment device SVR for the voltage fluctuation and steady voltage fluctuation is also suppressed by the static var compensator SVC. This may cause a phenomenon that the voltage adjustment device SVR will not operate.

In these cases, the static var compensator SVC continuously operates with the maximum output and lacks an output margin for suppressing abrupt voltage fluctuation. As a result, abrupt voltage fluctuation may not be suppressed. That is, there is a possibility that the function of suppressing voltage fluctuation against abrupt changes in photovoltaic power generation output, which is the intended purpose of the installation of the static var compensator SVC, cannot be performed.

When a voltage adjustment device SVR and a static var compensator SVC are installed together, it is important for both to appropriately exercise the suppression control of the voltage fluctuation.

Various techniques have been disclosed as control methods for operating a voltage adjustment device SVR and a static var compensator SVC in a coordinated manner. For example, Document 1 discloses a method that, in an optimum voltage adjustment device, the amounts of control of a voltage adjustment device SVR and a static var compensator SVC are determined by solving an optimization problem and the amounts of control are taken as a control command values for the individual devices.

Document 2 discloses a method of reducing the reactive power output of a static var compensator SVC with time and thereby transferring a control to a voltage adjustment device SVR and to share the control.

DOCUMENTS ON RELATED ARTS

Patent Documents

Document 1: JP 2009-65788
Document 2: JP 2006-166683

DISCLOSURE OF THE INVENTION

Problems to be Solved by the Invention

In the method disclosed in Document 1, it is necessary to collect information enabling load flow calculation in the system to determine the amounts of control of the static var compensator SVC and the voltage adjustment device SVR. For this purpose, it is necessary to install a sensor for grasping the state of the system and a transmission network and prepare an optimum voltage adjustment device. In addition, it is difficult to exercise quicker control than data collection and an optimization calculation period. As a result, an operation delay is produced to follow the abrupt voltage fluctuation, and this will increase the voltage deviation time.

The method disclosed in Document 2 involves a problem that a control error is produced with respect to a voltage target value because the output of a static var compensator SVC is to be reduced.

In consideration of the foregoing, it is an object of the present invention to provide a voltage adjustment device, a voltage adjusting method and a power control system for a distribution system, in which the voltage adjustment device and a static var compensator are appropriately operated in a coordinated manner and the sustention of voltage and the enhancement of the operation efficiency are attained.

Means for Solving the Problem

According to the foregoing, a voltage adjustment device of the present invention for a distribution system is installed in the distribution system including a static var compensator on an end side, controls a secondary voltage to be within a predetermined limit value by adjusting a tap position, and comprises a first unit configured to estimate the secondary voltage; a second unit configured to obtain a corrected voltage by correcting the estimated secondary voltage by using a correction amount obtained from an output of the static var compensator; and a third unit configured to compare the corrected voltage with the predetermined limit value and operate the tap position when the corrected voltage deviates from the predetermined limit value.

Preferably, the corrected voltage in the second unit is corrected and modified to a smaller value when the output of the static var compensator is increased to the advance side and is modified to a larger value when the output of the static var compensator is increased to the delay side.

Preferably, in the operation of the tap position in the third unit, a tap position is operated to be in a direction to increase the secondary voltage when the output of the static var compensator is increased to the advance side, and is operated to be in a direction to reduce the secondary voltage when the output of the static var compensator is increased to the delay side.

Preferably, the corrected voltage in the second unit is the secondary voltage when the static var compensator does not output.

Advantageous Effects of the Invention

The voltage adjustment device, voltage adjusting method, and power control system of the present invention for a distribution system can reduce, even in a system into which a large number of solar power generation devices has been introduced, the possibility of voltage deviation in the distribution system and also can reduce the required capacities of voltage control equipment with high-speed response, such as static var compensators SVC, which is required to suppress short-period voltage fluctuation.

Other advantageous effects of the present invention will be described in the specification.

DESCRIPTION OF EMBODIMENTS

Hereafter, an embodiment of the present invention will be described with reference to the drawings.

Embodiment

Figure 2:
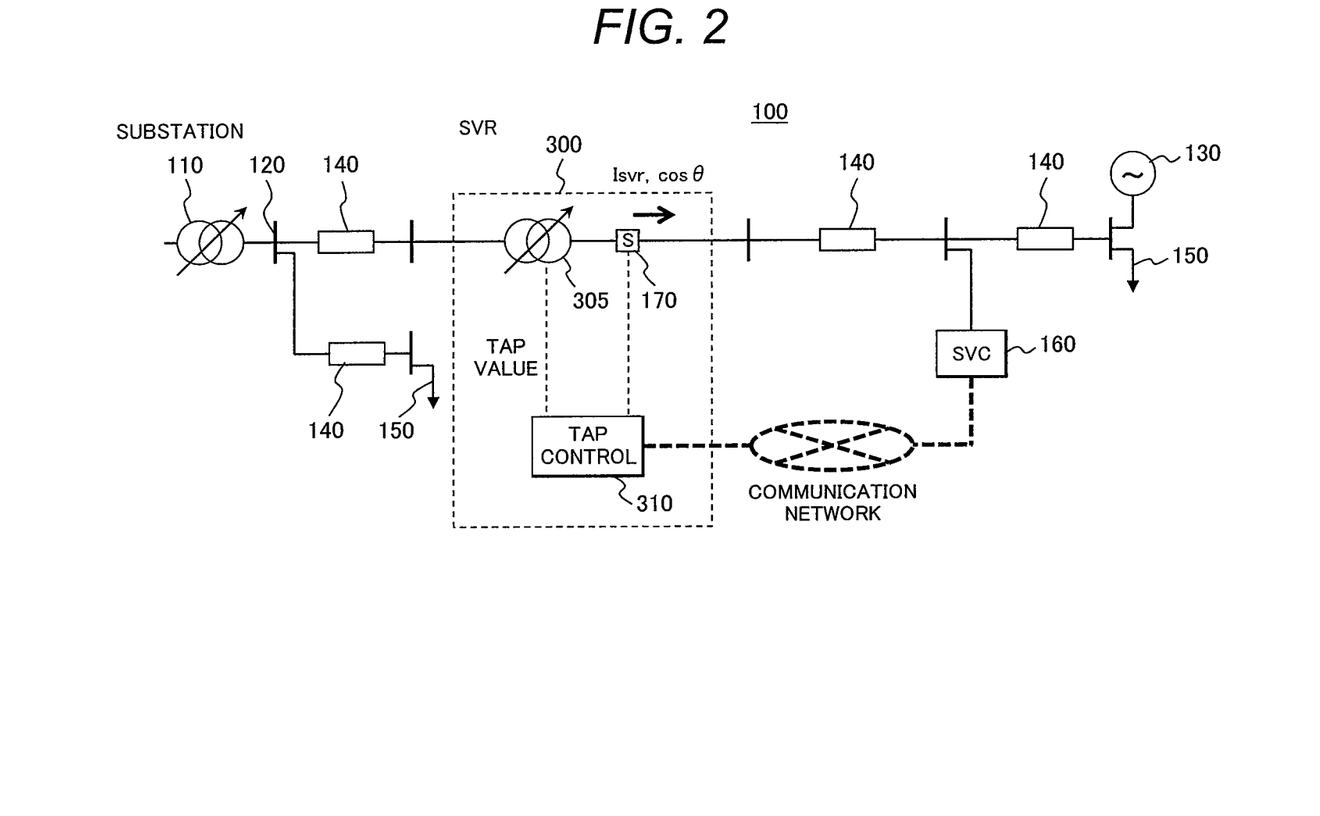
FIG. 2 is a drawing illustrating an example of a distribution system in which a voltage adjustment device and a static var compensator are installed.

FIG. 2 illustrates an example of a distribution system 100 (feeder) including a voltage adjustment device 300 (on-load tap-changing transformer LRT or an automatic voltage regulator SVR) and a static var compensator 160 (SVC or STATCOM). In FIG. 2, an automatic voltage regulator SVR is installed as the voltage adjustment device 300. However, anon-load tap-changing transformer LRT may be installed as the voltage adjustment device 300.

The typical distribution system 100 shown in FIG. 2 includes nodes (buses) 120, a distribution line 140 connecting them, loads 150 and a solar power generation device 130 connected to the nodes 120, a sensor 170 installed in the distribution line, and a distribution substation 110.

The left side of FIG. 2 where the distribution substation 110 is located will be designated as the sending side of the feeder, and the right side will be designated as the end side of the feeder. The automatic voltage regulator 300 is a voltage adjustment device that is installed in series with a line 140 and adjusts the line voltage.

The automatic voltage regulator SVR, which may be an on-load tap-changing transformer LRT in the distribution substation 110, includes a transformer 305 configured of an autotransformer and a tap changer and includes a control part, as illustrated in the automatic voltage regulator 300, for example.

Figure 1:
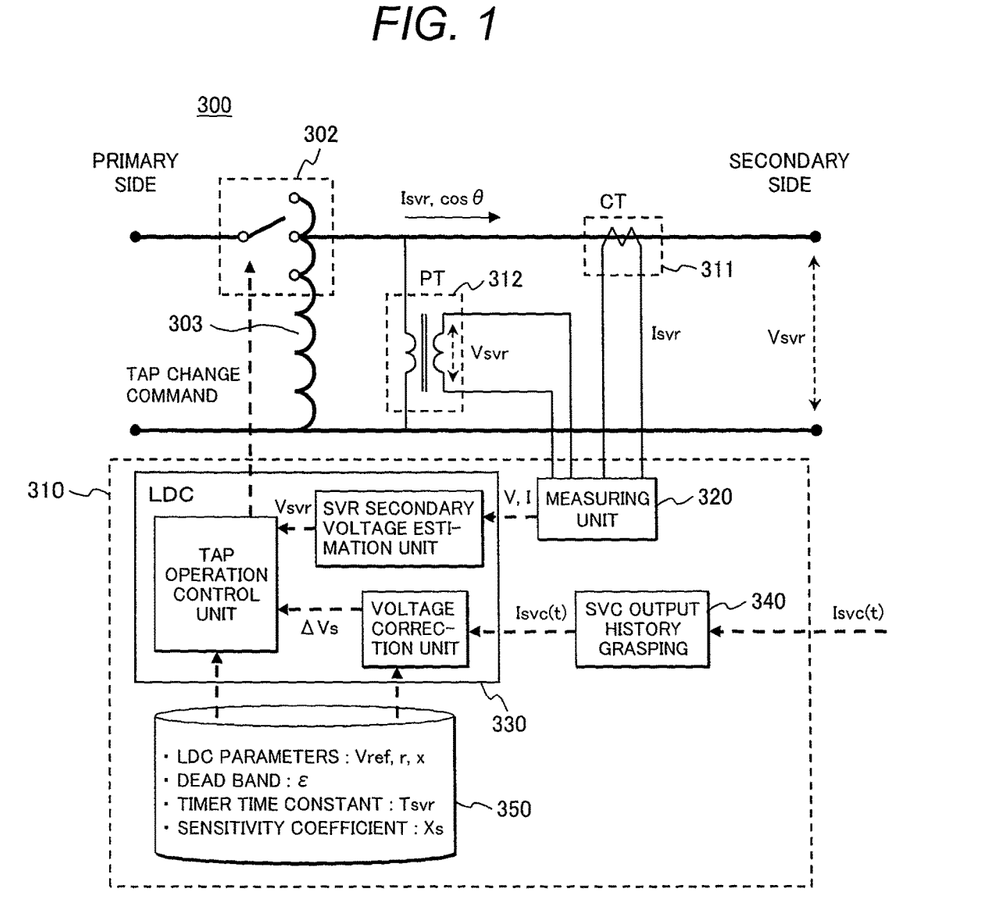
FIG. 1 is a drawing illustrating the configuration of a tap controller of an automatic voltage regulator SVR of the present invention.

The control part of the automatic voltage regulator SVR in FIG. 2 includes a sensor 170 for measuring the electrical quantities of the distribution line and a tap controller 310 for controlling the tap of the transformer. FIG. 1 illustrates the transformer 305 of the present invention and a concrete example of the circuit configuration of the control part.

In FIG. 1 in the present invention, an SVC output history grasping device 340 is added to the conventional tap controller 310, and a tap value is controlled by a line drop compensation circuit (LDC) 330 based on the information of the output history of the static var compensator SVC. The line drop compensator LDC is a controller that determines the secondary voltages of an on-load tap-changing transformer LRT or an automatic voltage regulator SVR to compensate voltage drop in the system. The line drop compensation circuit (LDC) 330 of the present invention operates based on the information of the tap controller 310 and the SVC output history grasping device 340.

With reference to FIG. 1, a description will be first given to the idea of conventional tap control and then to the relation with the SVC output history grasping device 340 added according to the present invention. FIG. 1 depicts an autotransformer 303 as a main circuit of the automatic voltage regulator 300, a tap changer 302, and the tap controller 310 as a controller.

The tap controller 310 includes a measuring unit 320, the line drop compensation circuit (LDC) 330, the SVC output history grasping device 340, and a database 350. The tap controller 310 controls the tap changer 302 to make the secondary voltage of the autotransformer 303 equal to a predetermined value.

The measuring unit 320 of the tap controller 310 is connected with a current sensor CT for measuring the secondary current Isvr of the distribution line and a voltage sensor PT for measuring the secondary voltage Vsvr thereof.

In the line drop compensation circuit (LDC) 330, change control is exercised when the secondary voltage Vsvr measured in the measuring unit 320 deviates from a predetermined limit value and this state continues for a predetermined measuring time or longer.

Various methods have been conventionally proposed for the above-mentioned change control in the tap controller 310. The change control of the present invention is not limited to these methods and can be exercised as below, for example.

In a typical example of tap change, the line drop compensation circuit (LDC) 330 calculates active power Psvr, reactive power Qsvr, and a power factor $\cos\theta$ from the secondary current Isvr and secondary voltage Vsvr measured in the measuring unit 320.

Further, the line drop compensation circuit (LDC) 330 reads parameters (R, X, Vref) used in the equation (1) from the database 350. A tap operation determination reference value Vs is calculated from the equation (1) in the tap controller 310.

$$Vs = Vref + R*Ir + X*Ii \quad (1)$$

where R, X, and Vref are preset parameters, and Ir and Ii are the real part and the imaginary part, respectively, of a passing current obtained from the measured passing current Isvr and the power factor $\cos\theta$. R is a coefficient to the real part Ir of the passing current of the automatic voltage regulator SVR. X is a coefficient to the imaginary part Ii of the passing current of the automatic voltage regulator SVR. Vref is a reference voltage.

The secondary voltage of the automatic voltage regulator SVR fluctuates according to the active power Psvr or the reactive power Qsvr. The equation (1) calculates the magnitude of the fluctuation as a reference value Vs. It can be said that the reference value Vs is obtained by calculating the voltage at the load gravity point of the distribution line among the voltages (secondary voltages) at respective points in the distribution line on the secondary side of the automatic voltage regulator SVR.

This value is a variable value which reflects a load status (active power fluctuation or reactive current fluctuation). The secondary voltage fluctuates according to the active power Psvr or the reactive power Qsvr even if the tap positions of the tap changer 302 of the autotransformer 303 are identical. When the secondary voltage deviates from a range determined by the equation (1), it is necessary to correct the tap position.

For this purpose, a timer provided in the tap controller totalizes the time for which the condition is met that the secondary voltage Vsvr of the automatic voltage regulator SVR exceeds a predetermined limit value $\epsilon$ relative to the reference value Vs obtained by the equation (1). When this totalized value exceeds a predetermined time Tsvr, a change command is issued to the tap.

For example, when the secondary voltage Vsvr of the automatic voltage regulator SVR is smaller than the reference value Vs by the predetermined value $\epsilon$ or more and this state continues for a predetermined time (for example, Tsvr seconds), the tap 302 of the automatic voltage regulator SVR is changed to the increasing direction to increase the secondary voltage. In contrast, when the secondary voltage Vsvr of the automatic voltage regulator SVR is larger than the reference value Vs by the predetermined value $\epsilon$ or more and this state continues for the predetermined time, the tap 302 of the automatic voltage regulator SVR is changed to the reducing direction to reduce the secondary voltage.

Figure 3:
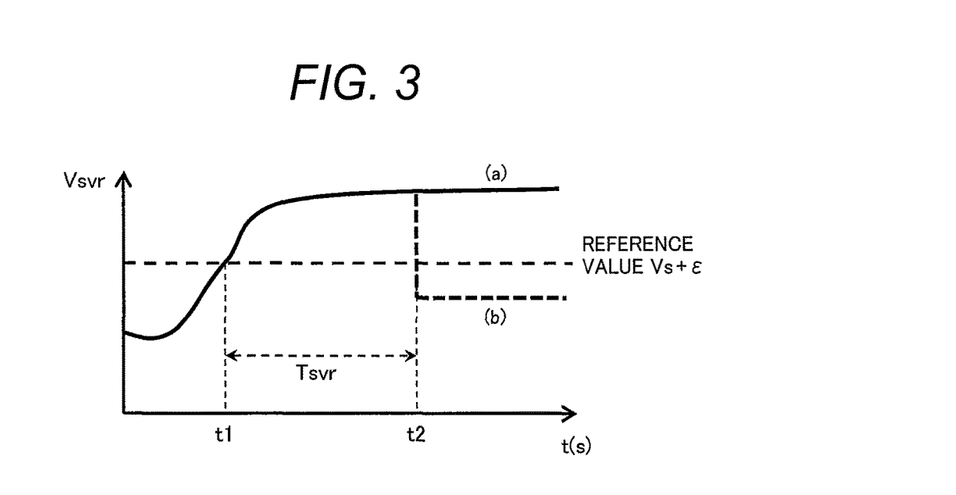
FIG. 3 is a drawing illustrating the progression of voltage when the voltage is reduced by a tap.

FIG. 3 is a voltage progression graph when the voltage is reduced by the tap. In FIG. 3, the horizontal axis indicates time t and the vertical axis indicates the secondary voltage Vsvr. The graph is made on the assumption that the secondary voltage Vsvr increases with the passage of time. Further, the graph is made on the assumption that the secondary voltage Vsvr of the automatic voltage regulator SVR exceeds a summed value (Vs+$\epsilon$) of the reference value and the predetermined value at time t1.

In this case, the tap controller 310 of the automatic voltage regulator SVR confirms that the secondary voltage Vsvr continuously exceeds the summed value (Vs+$\epsilon$) of the reference value and the predetermined value even after the predetermined set time of Tsvr seconds has passed. The tap controller 310 causes tap operation at time t2 when the predetermined set time of Tsvr seconds has passed.

As a result, as shown by the waveform indicated by a broken line (b), the secondary voltage Vsvr of the automatic voltage regulator SVR drops to the summed value (Vs+$\epsilon$) of the reference value and the predetermined value or below. The predetermined value $\epsilon$ is a constant for providing a dead band. The curve indicated by (a) indicates a case where the tap operation is not carried out.

In the conventionally known example in relation to the tap controller 310, as mentioned above, the line drop compensation circuit (LDC) 330 controls the secondary voltage Vsvr based on the information of the passing current of the automatic voltage regulator SVR and the parameters set on the line drop compensation circuit LDC.

In the present invention, tap control operation is determined considering the output history data of the static var compensator (SVC) 160 installed on the end side of the automatic voltage regulator SVR in addition to the tap operation determination reference value Vs of the tap controller of the automatic voltage regulator SVR.

As shown in FIG. 1, the tap controller 310 includes the line drop compensation circuit (LDC) 330, the measuring unit 320, the SVC output history grasping device 340, and the database 350.

The database 350 stores a dead band $\epsilon$, a timer time constant Tsvr, and a sensitivity coefficient Xs as parameters (LDC parameters) in addition to Vref, R, and X used in the equation (1).

The SVC output history grasping device 340, which is added according to the present invention, grasps data related to the output history of the static var compensator (SVC) 160 installed on the end side of the automatic voltage regulator SVR. For example, the present time is assumed to be t2 and an appropriate past time is assumed to be t1. Time-series data (Isvc(t)) of the output current Isvc supplied from the static var compensator SVC during the period from time t1 to time t2 is collected. The time-series data Isvc(t) can be directly received from the static var compensator SVC through a communication network.

The SVC output history grasping device 340 receives time-series data Isvc(t) at constant time interval (for example, at time interval T (=t2−t1)) and instructs the line drop compensation circuit (LDC) 330 to start the tap calculation commanding.

The line drop compensation circuit (LDC) 330 performs operation determination according to the parameters in the database 350 and the SVC output history current Isvc(t) of the SVC output history grasping device 340. The line drop compensation circuit (LDC) 330 thereby determines whether or not it was necessary to exercise the tap control of the automatic voltage regulator SVR during the past time period T and obtains a tap command value. When it is determined that the tap control is necessary to be exercised, the line drop compensation circuit (LDC) 330 sends a tap change command to the automatic voltage regulator SVR.

Before the operation of the device according to the present invention is described, a description will be given to the idea about the tap control operation of the automatic voltage regulator SVR performed in a coordinated way considering the output of the static var compensator SVC with reference to FIG. 4 and FIG. 5.

Figure 4:
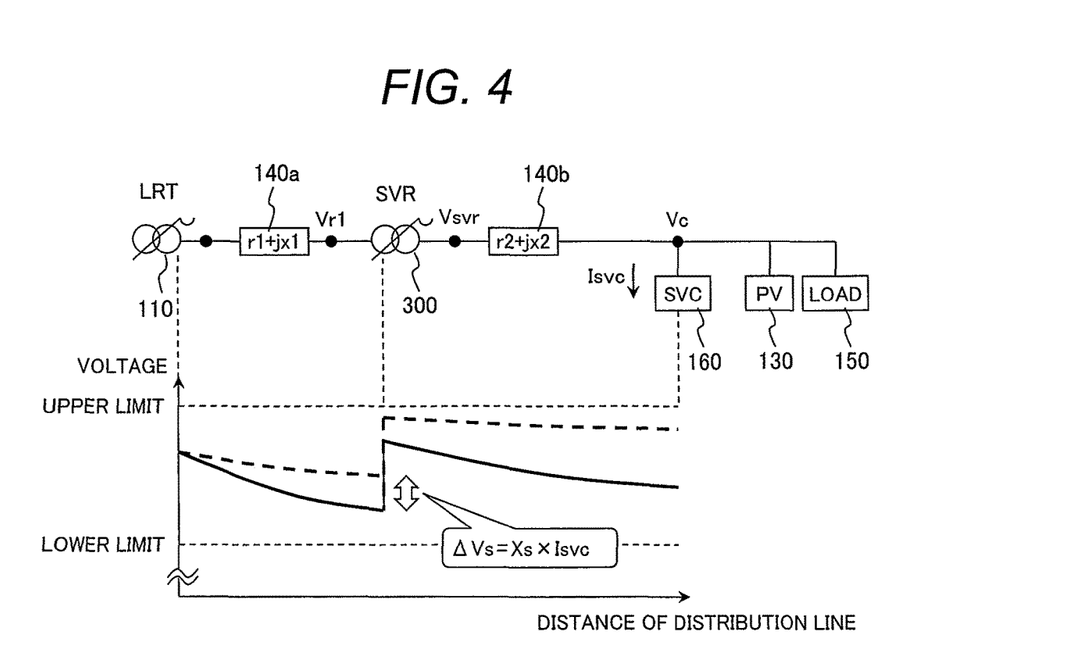
FIG. 4 is a drawing illustrating the idea in which the elements of a static var compensator are incorporated into tap control operation.

FIG. 4 shows an example of a distribution system in which the automatic voltage regulator SVR and the static var compensator SVC are installed. In the graph at the lower part of FIG. 4, the horizontal axis indicates the distance of the distribution line (corresponding to the place of the distribution system in this example) and the vertical axis indicates the voltage of the distribution line.

the following voltage distributions are schematically shown:

In the graph, the voltage distribution is schematically shown by a broken line in a situation where the static var compensator SVC does output so that the voltage Vc at its own end is controlled to be constant, and the voltage distribution is schematically shown by a solid line in a situation where the static var compensator SVC does not do output (output Isvc=0).

As mentioned above, the static var compensator SVC, which is operated by the static mechanism, operates faster than the automatic voltage regulator SVR having the machine mechanism. When the static var compensator SVC is working, the static var compensator SVC controls the voltage Vc at its own end to a constant value and achieves the voltage distribution of the distribution line indicated by the broken line. In this state, the condition of the line is held constant. Therefore, the automatic voltage regulator SVR cannot detect that the automatic voltage regulator SVR itself should operate from the information (Vsvr and so on) of its own end.

In contrast, when the automatic voltage regulator SVR operates on the assumption that there is no output from the static var compensator SVC, the output of the static var compensator SVC can be reduced and it is thought that operation is appropriately shared. In other words, it can be said that appropriate coordinated voltage control can be implemented such that the automatic voltage regulator SVR is in charge of long-time voltage fluctuation and the static var compensator SVC is in charge of short-time voltage fluctuation.

To achieve such control, the information is needed of the own end of the automatic voltage regulator SVR without the output of the static var compensator SVC. Specifically, for example, ΔVs is needed which is a difference in voltage of the information of the own end of the automatic voltage regulator SVR between the presence and absence of the output of the static var compensator SVC. Once ΔVs is obtained, the tap control of the automatic voltage regulator SVR can be exercised on the assumption that there is no output from the static var compensator SVC by subtracting ΔVs from the measured voltage Vsvr of its own end.

Based on the basic concept of the present invention, the following operation is proposed. The automatic voltage regulator SVR grasps the output current value or output history information of the static var compensator SVC, estimates the voltage value of its own end on the assumption that there is no output from the static var compensator SVC based on the above information, and determines a tap value based on the estimated voltage value of its own end. In the estimation of the voltage value of its own end, the voltage correction amount ΔVs is calculated using, for example, the output current Isvc of the static var compensator SVC and the parameter Xs equivalent to the short circuit reactance on the distribution substation side from the automatic voltage regulator SVR.

When the output current Isvc of the static var compensator SVC cannot be continuously obtained, for example, when information is sent from the static var compensator SVC at a time interval, control described below can be exercised. First, time-series data (history information) Isvc after information to be received was previously received is received instead of the current value. The automatic voltage regulator SVR stores the measurement information of its own end after the previous reception, too. When the information of the output current Isvc of the static var compensator SVC is received, it is retroactively calculated whether or not the tap control of the automatic voltage regulator SVR was necessary to the time of the previous reception. Based on the result of the calculation, the present tap of the automatic voltage regulator SVR is determined.

Figure 5:
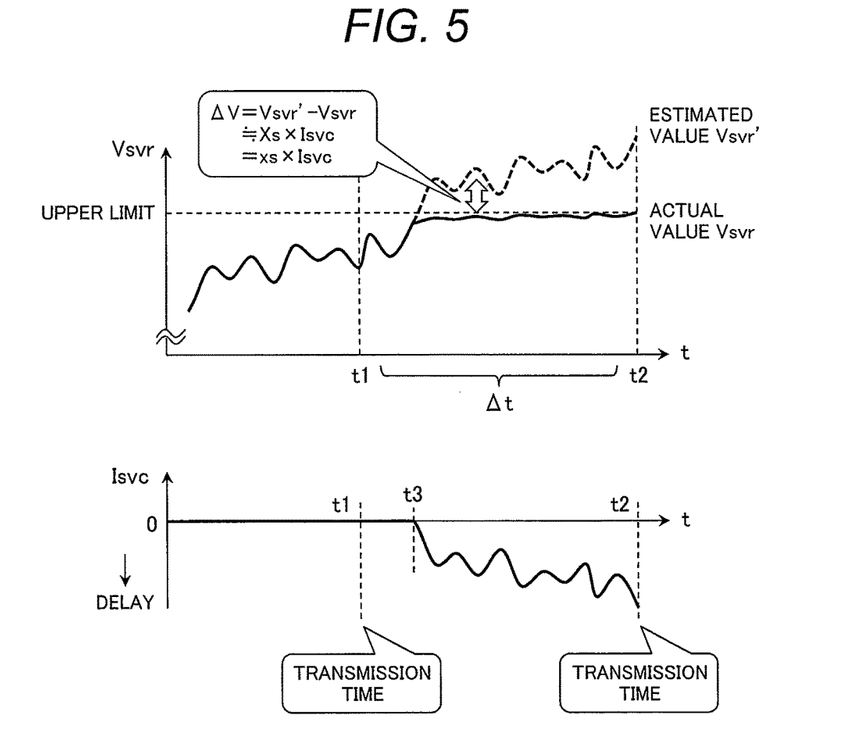
FIG. 5 is a drawing illustrating the idea of the output history data of a static var compensator.

FIG. 5 depicts an image of the output current Isvc of the static var compensator SVC communicating at a time interval. In both graphs, the horizontal axis indicates time. The vertical axis in the upper graph indicates the secondary voltage Vsvr of the automatic voltage regulator SVR, and the vertical axis in the lower graph indicates the output Isvc of the static var compensator SVC. In the upper graph, the actual Vsvr is indicated by a solid line and the secondary voltage estimated value Vsvr' on the assumption that there is no output from the static var compensator SVC is indicated by a broken line.

In this case indicated by the graphs, the state continues until the time near time t3 in which there is no output from the static var compensator SVC (Isvc=0), and, during this time period, the secondary voltage Vsvr of the automatic voltage regulator SVR increases with repeated fluctuation.

The static var compensator SVC is about to control the voltage of its own end to the upper limit value of the distribution line or below. At time t3, the voltage reaches the upper limit and operation is started to turn the output Isvc of the static var compensator SVC to the delay side. As a result, the secondary voltage Vsvr of the automatic voltage regulator SVR is fixed at the upper limit. This is shown as the actual Vsvr by the solid line from time t3 to time t2. This example shows a case where the value of Vsvr is close to the upper limit of the voltage of the distribution line when the static var compensator SVC does output.

In contrast, in a case where there is no output from the static var compensator SVC, it is estimated that the secondary voltage Vsvr' of the automatic voltage regulator SVR will be measured as a value exceeding the upper limit voltage as indicated by the broken line. It is possible to retroactively calculate what value the tap value of the automatic voltage regulator SVR should have been from the estimated time-series data.

In data transmission from the static var compensator SVC to the automatic voltage regulator SVR, if the present time is t2, the Isvc information for the period from t1 to t2 is collectively transmitted to time t2 (present point of time).

Figure 6:
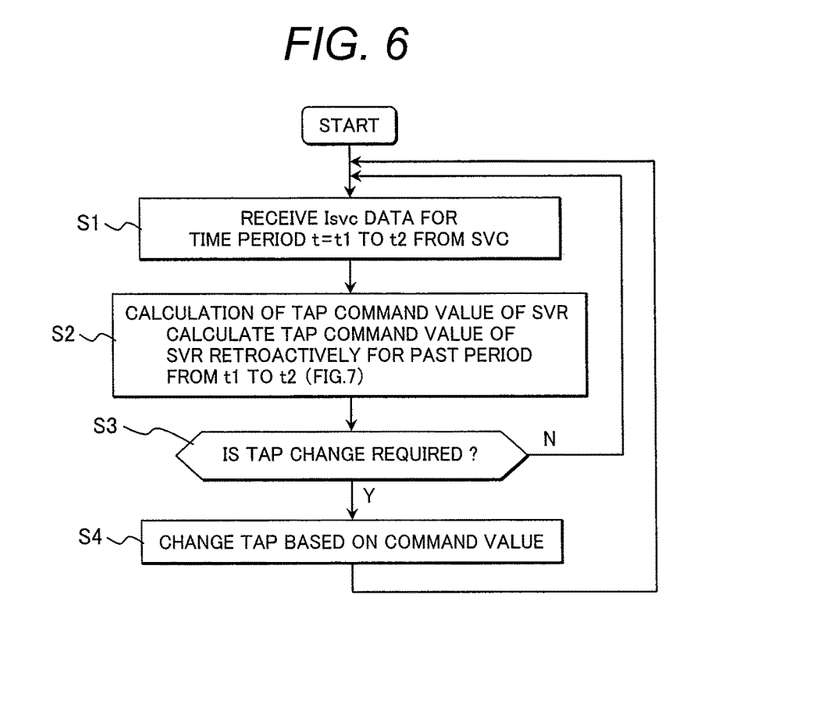
FIG. 6 is a drawing illustrating a control process flow in an automatic voltage adjustment device SVR of the present invention.

FIG. 6 shows the flow of tap change process of the automatic voltage regulator SVR based on the above idea. A description will be hereafter given to the overview of the process of each of Step S1 to Step S4.

At Step S1 in FIG. 6, the Isvc history data for the period from time t1 to time t2 in FIG. 5 is received from the static var compensator SVC.

At Step S2, the tap command value of the automatic voltage regulator SVR is calculated. Specifically, the tap command value of the automatic voltage regulator SVR is calculated retroactively for the past period from t1 to t2. The details of this calculation process will be described later with reference to FIG. 7.

At Step S3, if the tap of the automatic voltage regulator SVR should be changed, then the process proceeds to Step S4. Otherwise, the process returns to the start.

At Step S4, the tap of the automatic voltage regulator SVR is changed based on a command value.

A description will be given to the calculation process for the tap command value of the automatic voltage regulator SVR at Step S2 in FIG. 6. The description will be given in detail to the process of each of Step S20 to Step S28 with reference to FIG. 7.

Figure 7:
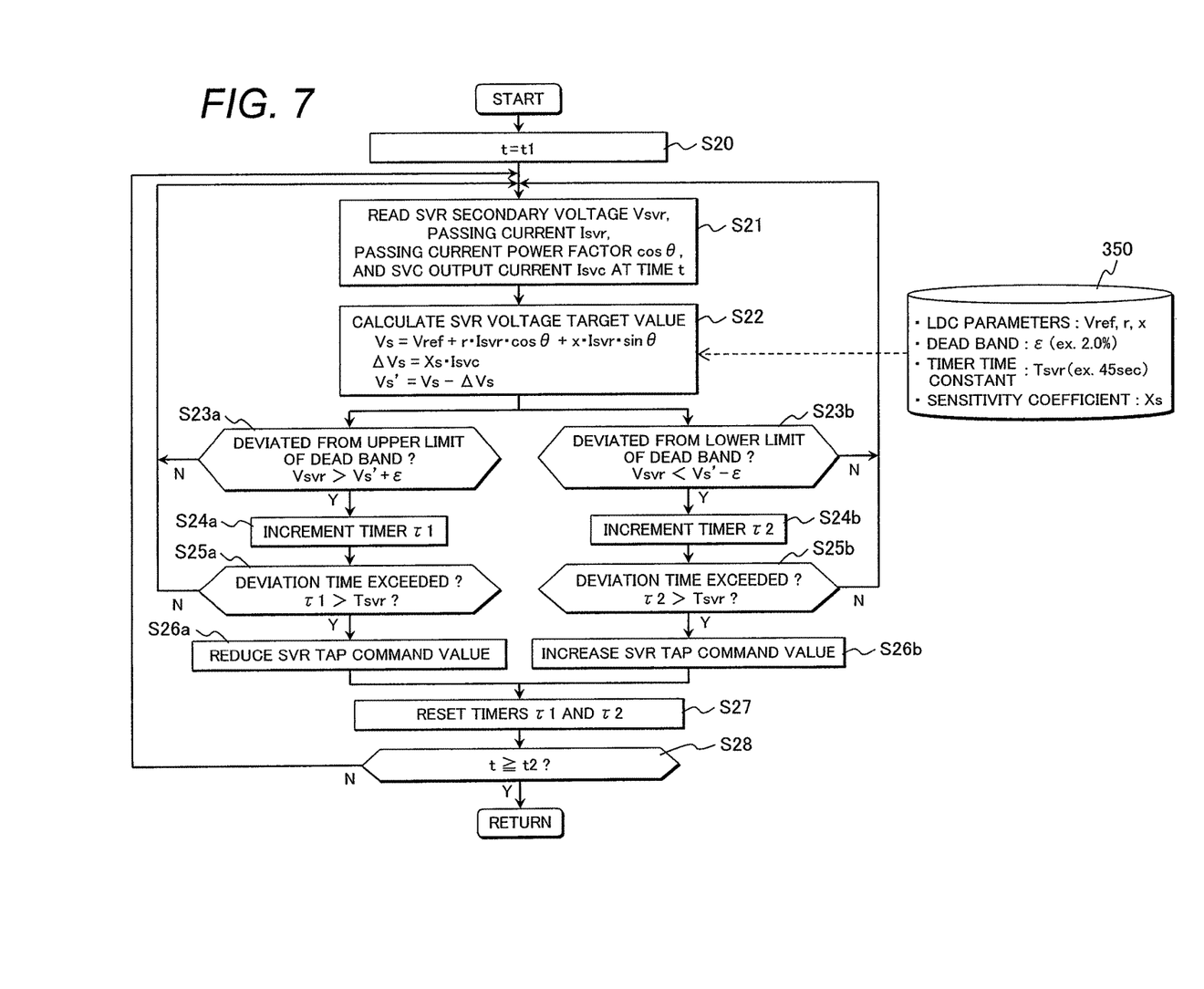
FIG. 7 is a flowchart of tap command value calculation process in an automatic voltage adjustment device SVR.

At first Step S20, time t of data to be processed is set to t1 (the value immediately after the previous calculation in the past history).

At Step S21, the SVR secondary voltage Vsvr, the passing current Isvr, the passing current power factor cos θ, and the SVC output current Isvc used in the tap control at time t are read and acquired.

At Step S22, the tap operation determination reference value Vs and the voltage correction amount ΔVs are calculated by the equations (2), (3) and (4). The database 350 is appropriately referred to for the parameters used in these equations.

$$\Delta Vs = Xs \times Isvc. \quad (2)$$

FIG. 4 shows the concept of the voltage correction amount ΔVs obtained by the equation (2). This is obtained by determining a difference in the terminal voltages of the automatic voltage regulator SVR between when the output of the static var compensator SVC is absent and when the output is present.

The tap operation determination reference value Vs is obtained from the equation (3) which concretely expresses the equation (1).

$$Vs = Vref + R^* Isvr^* \cos\theta + X^* Isvr^* \sin\theta. \quad (3)$$

Since the tap operation determination reference value Vs in the equation (3) contains a voltage fluctuation amount due to the output of the static var compensator SVC, this influence amount is excluded by the equation (4). As a result, the tap operation determination reference value Vs' is obtained on the assumption that there is no static var compensator SVC.

$$Vs' = Vs - \Delta Vs. \quad (4)$$

At Step S23, subsequently, it is determined that the amount of voltage variation deviates from the upper and lower limit values of the dead band. Deviation from the lower limit value is determined in the right column in FIG. 7, and deviation from the upper limit value is determined in the left column. At Step S23a, deviation from the upper limit of the dead band is determined by inequality (5).

$$Vsvr > Vs' + \epsilon. \quad (5)$$

When the inequality (5) is not satisfied, the process returns to Step S21 and the above-mentioned process is repeated based on new input at the next time of process.

When the inequality (5) is satisfied (the amount of voltage variation deviates from the upper limit of the dead band), the process proceeds to Step S24a and the count on timer τ1 is incremented. At Step S25a, subsequently, the count value on the timer τ1 is compared with a set value of the deviation confirmation time Tsvr. When the count value exceeds the set time, the process proceeds to Step S26a.

At Step S26a, the tap of the automatic voltage regulator SVR is changed to the direction in which the secondary voltage is reduced.

At Step S23b, meanwhile, deviation from the lower limit of the dead band is determined by inequality (6).

$$Vsvr < Vs' - \epsilon. \quad (6)$$

When the inequality (6) is not satisfied, the process returns to Step S21 and the above-mentioned process is repeated based on new input at the next time of process.

When the inequality (6) is satisfied (the amount of voltage variation deviates from the lower limit of the dead band), the process proceeds to Step S24b and the count on timer τ2 is incremented. At Step S25b, subsequently, the count value on the timer τ2 is compared with a set value of the deviation confirmation time Tsvr. When the count value exceeds the set time, the process proceeds to Step S26b.

At Step S26b, the tap of the automatic voltage regulator SVR is changed to the direction in which the secondary voltage is increased.

The process of Step S27 is carried out after the tap change process and the values on the timers τ1 and τ2 are reset to 0.

At Step 28, if the time reaches t2 (current value), the series of process is terminated (the process proceeds to Step 3 in FIG. 6), and otherwise, the process returns to Step 21.

Through the above-mentioned series of process, the tap operation determination reference value Vs' of the automatic voltage regulator SVR is modified to a smaller value when the output of the static var compensator SVC is increased to the advance side. As a result, operation is performed to raise the tap of the automatic voltage regulator SVR (to increase the secondary voltage). Conversely, when the output of the static var compensator SVC is increased to the delay side, the tap operation determination reference value Vs' of the automatic voltage regulator SVR is modified to a larger value. As a result, operation is performed to lower the tap of the automatic voltage regulator SVR (to reduce the secondary voltage).

Further, the range of fluctuation in the output of the static var compensator SVC can be narrowed by the influence of these tap operations in the automatic voltage regulator SVR. This means that it is unnecessary to operate the static var compensator SVC to the output limit point thereof.

Figure 8:
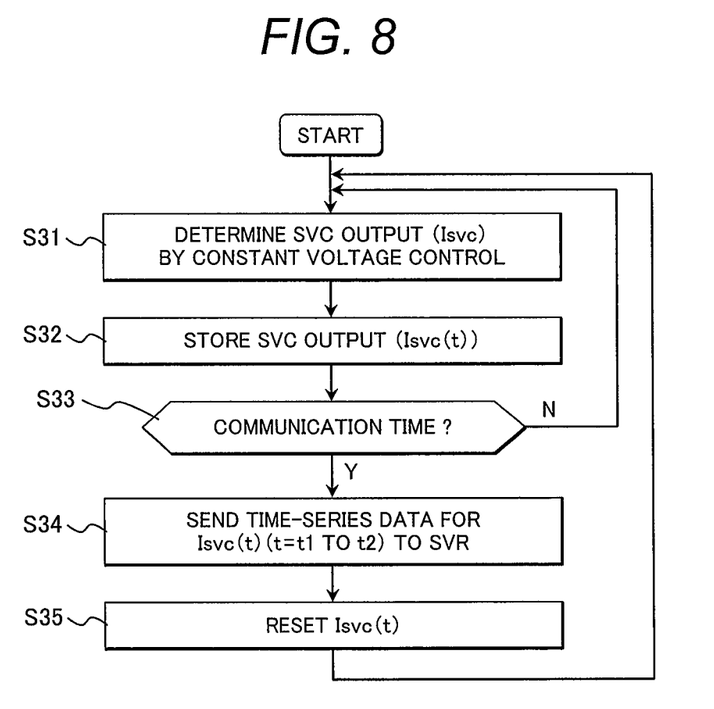
FIG. 8 is a drawing illustrating a flow of output data transmission process in a static var compensator SVC.

With reference to FIG. 8, a description will be given to the operation process carried out by the static var compensator SVC to send data to the automatic voltage regulator SVR. The description will be given to the overview of the process of each of Step S31 to Step S35.

At Step S31, the output Isvc is determined by, for example, constant voltage control according to the control logic of the static var compensator SVC.

At Step S32, the output Isvc of the static var compensator SVC is stored.

At Step S33, it is determined whether a communication time has come (whether Δt has substantially passed after the previous time of the communication). If the communication time has come, the process proceeds to Step S34, and otherwise, the process returns to Step S31.

At Step S34, Isvc for the concerned period (t=t1 to t2) in the communication interval is sent to SVR.

At Step S35, the stored time-series data of Isvc(t) is reset and the process returns to Step S31.

Figure 9:
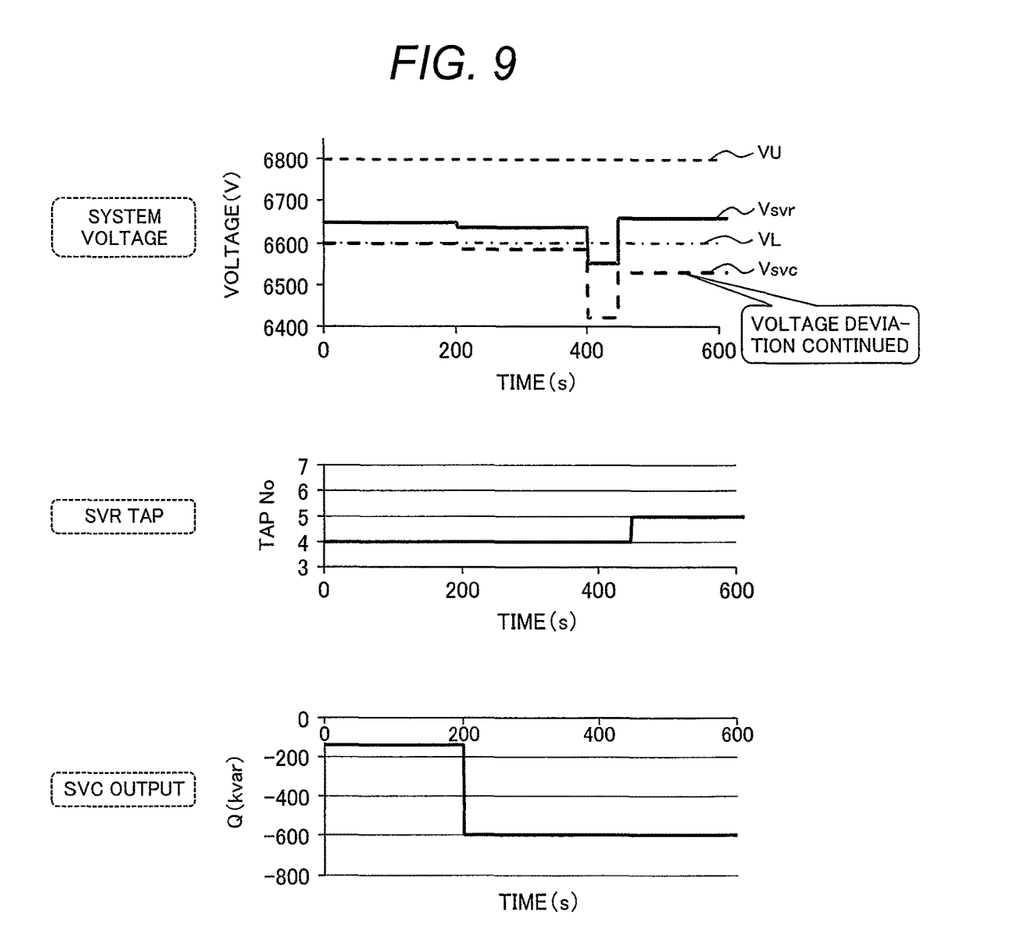
FIG. 9 is a drawing illustrating control operations of an automatic voltage regulator and a static var compensator according to a conventional technique.
Figure 10:
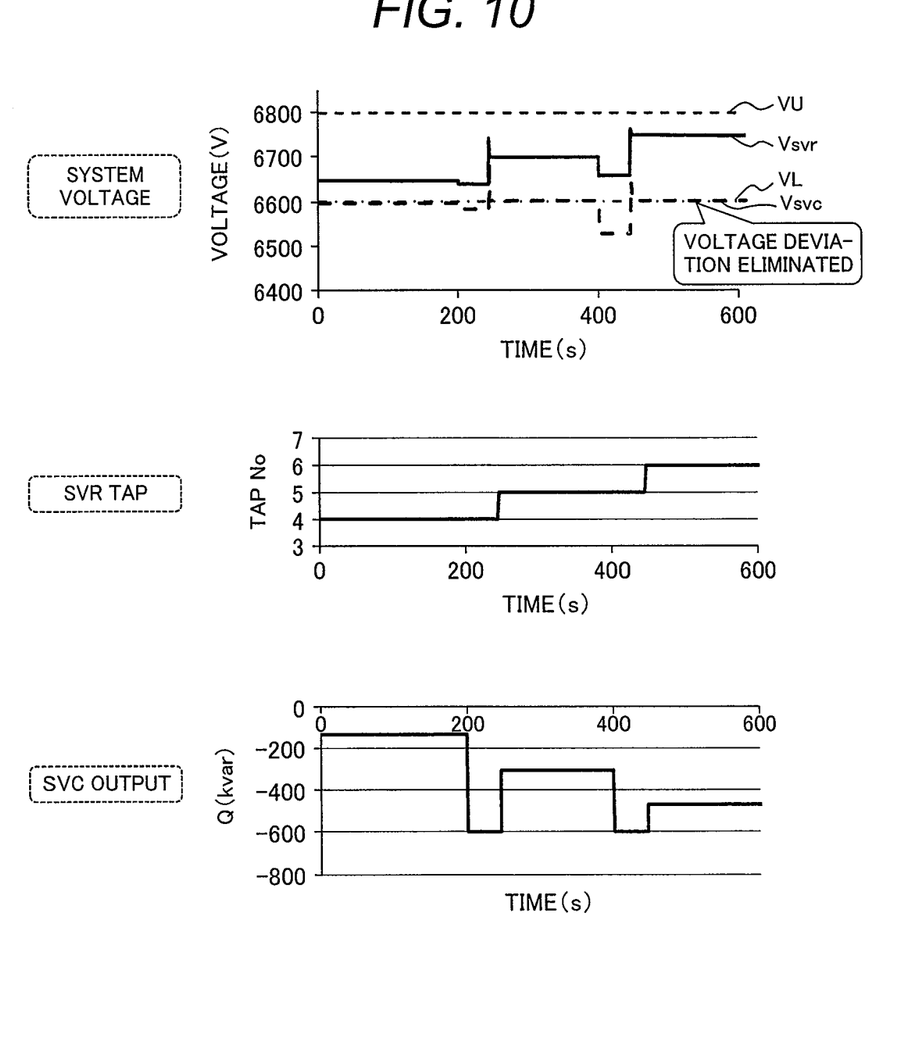
FIG. 10 is a drawing illustrating control operations of an automatic voltage regulator and a static var compensator according to the present invention.

FIG. 9 and FIG. 10 illustrate an example of the control operation for the automatic voltage regulator SVR and the static var compensator SVC according to a conventional technique and an example of control operation waveform according to the present invention.

FIG. 9 shows an example of control operation waveforms of the system voltage, the automatic voltage regulator SVR tap, and the reactive power output in proportion to the output current of the static var compensator SVC according to the conventional technique. The upper graph in FIG. 9 indicates the voltage values at the automatic voltage regulator SVR end and the static var compensator SVC end over the passage of time. The middle graph in FIG. 9 indicates the movement of the tap number of the automatic voltage regulator SVR over the passage of time. The lower graph in FIG. 9 indicates the transition of the reactive power output of the static var compensator SVC over the passage of time.

This drawing shows a case where the passage of time indicated by the horizontal axis is a period of 600 seconds (10 minutes); the upper limit of the output of the static var compensator SVC is ±600 kvar; and the load on the distribution line is increased at time points of 200 seconds and 400 seconds. In this case of operation, the automatic voltage regulator SVR and the static var compensator SVC are controlled to control the voltage at the static var compensator SVC end in a range from lower limit voltage VL (6600 volt) to upper limit voltage VU (6800 volt).

In this case, during the time period from 0 to 200 seconds, the tap number of the automatic voltage regulator SVR is 4 and the reactive power output of the static var compensator SVC is −150 (kvar). As a result, the system voltage is held at 6650 volt.

The static var compensator SVC is actuated to hold the system voltage constant in response to a load increase at time of 200 seconds and the reactive power output thereof is reduced to −600 (kvar) as the lower limit. Then, the voltage cannot be held at 6650 volt as the value immediately before and slightly drops. However, since the lower limit voltage VL (6600 volt) is not reached, the automatic voltage regulator SVR does not exercise tap change control.

In this state, the output of the static var compensator SVC has reached the lower limit of −600 kvar but the tap of the automatic voltage regulator SVR has not been changed. Further, at time of 400 seconds, a second load increase occurs but the static var compensator SVC cannot respond to this increase. For this reason, the system voltage is equal to or less than the lower limit voltage VL (6600 volt) and the automatic voltage regulator SVR starts monitoring the duration of this state.

For this reason, during a confirmation time while the tap of the automatic voltage regulator SVR is changed to Stage 5, both the voltage Vsvr at the automatic voltage regulator SVR end and the voltage Vsvc at the static var compensator SVC end deviate from the lower limit voltage VL (6600 volt). Even though the voltage Vsvr at the automatic voltage regulator SVR end is recovered to the lower limit voltage or higher with the tap changed to Stage 5, the voltage Vsvc at the static var compensator SVC end cannot be recovered to the lower limit voltage or higher.

FIG. 10 shows an example of the control operation waveforms of the automatic voltage regulator SVR and the static var compensator SVC according to the present invention observed under the same conditions as in FIG. 9. A description will be given comparing the waveforms in FIG. 10 with the waveforms in FIG. 9.

During the time period from 0 to 200 seconds, the tap number of the automatic voltage regulator SVR is 4 and the reactive power output of the static var compensator SVC is −150 (kvar). As a result, the system voltage is held at 6650 volt. At time of 200 seconds, thereafter, a load is increased. In response to the load increase, the static var compensator SVC is actuated to hold the system voltage constant. The assumed state up to this point is the same as the conventional case shown in FIG. 9.

In the case of the present invention, the automatic voltage regulator SVR estimates the secondary voltage on the assumption that the static var compensator SVC does not work in the subsequent operation. In this estimation, due to the load increase at time point of 200 seconds, the secondary voltage drops to the lower limit voltage VL or below. As a result, when a confirmation time after time point of 200 seconds has passed, the automatic voltage regulator SVR performs tap operation to raise the position of the tap from Stage 4 to Stage 5.

During this confirmation time period, the static var compensator SVC reduces the reactive power output thereof to the lower limit of −600 (kvar). However, as the result of the tap change in the automatic voltage regulator SVR, the reactive power output is finally stabilized when the reactive power output is reduced to, for example, −300 (kvar). Further, during this confirmation time period, the system voltage is held at the lower limit voltage VU or higher because of the reduction by the static var compensator SVC to the lower limit of −600 (kvar). The system voltage is thereafter kept at, for example, 6700 volt because of the influence of the tap operation.

In the state in which the output of the static var compensator SVC is −300 kvar and the tap of the automatic voltage regulator SVR is at Stage 5, a second load is increased at time point of 400 seconds. Also at this time, the static var compensator SVC immediately corresponds to the load increase and reduces the reactive power output thereof to the lower limit of −600 (kvar).

Also at this time, the automatic voltage regulator SVR estimates the secondary voltage on the assumption that the static var compensator SVC does not work. In this estimation, due to the second load increase at time point of 400 seconds, the secondary voltage drops to the lower limit voltage VL or below. As a result, when a confirmation time after time of 400 seconds has passed, the automatic voltage regulator SVR performs tap operation to raise the position of the tap from Stage 5 to Stage 6.

During a confirmation time while the tap of the automatic voltage regulator SVR is changed to Stage 6, voltage deviation occurs in the voltage Vsvr at the automatic voltage regulator SVR end. However, with the tap changed to Stage 6, the voltage Vsvc at the static var compensator SVC end is also recovered to the lower limit voltage VU or higher.

As mentioned above, the magnitude and duration of the voltage deviation can be reduced by appropriately sharing the voltage control through the tap operation in the automatic voltage regulator SVR when the static var compensator SVC does output. Further, from this result, the effect of shortening the voltage deviation time is achieved even though the required capacity of the static var compensator SVC is small.

The above-mentioned control according to the present invention brings about the effects that the possibility of voltage deviation can be reduced and the required capacity of other voltage control equipment with high-speed response, which is required to suppress short-period voltage fluctuation, can be reduced.

The automatic voltage regulator SVR collectively acquires the output history of the static var compensator SVC at intervals. This brings about the effects that coordinated control can be exercised, the cost of communication equipment can be decreased, and a required communication band can be reduced even when the communication network has poor performance in transmission capacity and communication interval, for example.

As mentioned above, voltage can be efficiently sustained by exercising the tap change control in the automatic voltage regulator SVR according to the state of the static var compensator SVC.

INDUSTRIAL APPLICABILITY

The invention can be utilized as a voltage adjustment device for adjusting the voltage of distribution systems. Further, the invention can be utilized as a control system for SVR as a voltage adjustment device and a distribution substation LRT and a control system for a static var compensator SVC. In addition, the invention can be utilized as a measure for sustaining voltage and a measure for enhancing the utilization factor of distribution equipment corresponding to the addition of dispersed power sources of photovoltaic power generation in a distribution system.

EXPLANATION OF REFERENCE CHARACTERS

100 . . . distribution system,
110 . . . distribution substation,
120 . . . nodes,
130 . . . solar power generation device,
140 . . . distribution line,
150 . . . load,
160 . . . SVC,
170 . . . sensor,
300 . . . SVR,
302 . . . tap changer,
303 . . . autotransformer,
305 . . . transformer,
310 . . . tap controller,
CT . . . current sensor,
PT . . . voltage sensor,
320 . . . measuring unit of controller,
330 . . . LDC,
340 . . . SVC output history grasping device,
350 . . . database.

What is claimed is:

1. A voltage adjustment device for a distribution system which is installed in the distribution system including a static var compensator on an end side and controls a secondary voltage to be within a predetermined limit value by adjusting a tap position, the voltage adjustment device comprising:
a first unit configured to estimate the secondary voltage;
a second unit configured to obtain a corrected voltage by correcting the estimated secondary voltage by using a correction amount obtained from an output of the static var compensator; and
a third unit configured to compare the corrected voltage with the predetermined limit value and operate the tap position when the corrected voltage deviates from the predetermined limit value,
wherein the voltage adjustment device receives output history data of the static var compensator and obtains a tap command value for a past predetermined period.

2. The voltage adjustment device for a distribution system according to claim 1,
wherein the corrected voltage in the second unit is corrected and modified to a smaller value when the output of the static var compensator is increased to the advance side and is modified to a larger value when the output of the static var compensator is increased to the delay side.

3. The voltage adjustment device for a distribution system according to claim 1,
wherein, in the operation of the tap position in the third unit, a tap position is operated to be in a direction to increase the secondary voltage when the output of the static var compensator is increased to the advance side, and is operated to be in a direction to reduce the secondary voltage when the output of the static var compensator is increased to the delay side.

4. The voltage adjustment device for a distribution system according to claim 1,
wherein the corrected voltage in the second unit is the secondary voltage when the static var compensator does not output.

5. The voltage adjustment device for a distribution system according to claim 1,
wherein the second unit obtains the corrected voltage by adding a first correction amount obtained from the output of the static var compensator to the estimated secondary voltage, and
wherein the third unit performs tap lowering operation in a tapped transformer when a period while the first corrected voltage is equal to or higher than a predetermined upper limit value continues for a predetermined time or longer, and performs tap raising operation in the tapped transformer when a period while the corrected voltage is equal to or lower than a predetermined lower limit value continues for a predetermined time or longer.

6. A voltage adjusting method for a distribution system comprising the steps of:
controlling a voltage control by a static var compensator on an end side of a distribution system;
further controlling the voltage by an adjustment of a tap position in a voltage adjustment device on an upstream side of the distribution system,
wherein the adjustment of the tap position in the voltage adjustment device comprising the steps of:
estimating a secondary voltage;
obtaining a corrected voltage by correcting the estimated secondary voltage by using a correction amount obtained from an output of the static var compensator;
comparing the corrected voltage with a predetermined limit value; and
operating the tap position when the corrected voltage deviates from the predetermined limit value,
wherein the voltage adjustment device receives output history data of the static var compensator and obtains a tap command value for a past predetermined period.

7. The voltage adjusting method for a distribution system according to claim 6,
wherein the corrected voltage is corrected and modified to a smaller value when the output of the static var compensator is increased to the advance side and is modified to a larger value when the output of the static var compensator is increased to the delay side.

8. The voltage adjusting method for a distribution system according to claim 6, wherein, in the operation of the tap position, a tap position is operated to be in a direction to increase the secondary voltage when the output of the static var compensator is increased to the advance side, and is operated to be in a direction to reduce the secondary voltage when the output of the static var compensator is increased to the delay side.

9. The voltage adjusting method for a distribution system according to claim 6, wherein the corrected voltage is the secondary voltage when the static var compensator does not output.

10. A power control system for a distribution system comprising:

a voltage adjustment device which is provided on an upstream side of the distribution system and controls a secondary voltage to be within a predetermined limit value by adjusting a tap position; and a static var compensator which is provided on a downstream side of the distribution system and controls a voltage of the distribution system to be constant;

wherein the voltage adjustment device includes:

a first unit configured to estimate the secondary voltage of a tapped transformer;

a second unit configured to obtain a corrected voltage by correcting the estimated secondary voltage by using a correction amount obtained from a power output of the static var compensator;

a third unit configured to compare the corrected voltage with the predetermined limit value and operate a tap in the tapped transformer when the corrected voltage deviates from the predetermined value; and a fourth unit configured to transmit power output information of the static var compensator to the voltage adjustment device, wherein the voltage adjustment device receives output history data of the static var compensator and obtains a tap command value for a past predetermined period.

* * * * *